US009106976B2

(12) United States Patent
Emerson et al.

(10) Patent No.: US 9,106,976 B2
(45) Date of Patent: *Aug. 11, 2015

(54) SYSTEM AND METHOD FOR SHARING USER CONTENT THROUGH A SET-TOP BOX

(71) Applicant: CenturyLink Intellectual Property LLC, Denver, CO (US)

(72) Inventors: David E. Emerson, Overland Park, KS (US); Gary W. LaFreniere, Olathe, KS (US); Kelsyn D. S. Rooks, Overland Park, KS (US); Michael S. Goergen, Bend, OR (US)

(73) Assignee: CenturyLink Intellectual Property LLC, Denver, CO (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/910,706

(22) Filed: Jun. 5, 2013

(65) Prior Publication Data
US 2013/0305275 A1  Nov. 14, 2013

Related U.S. Application Data

(63) Continuation of application No. 12/475,158, filed on May 29, 2009, now Pat. No. 8,467,275.

(51) Int. Cl.
*H04N 21/835* (2011.01)
*H04L 29/08* (2006.01)
(Continued)

(52) U.S. Cl.
CPC ............ *H04N 21/835* (2013.01); *G11B 27/034* (2013.01); *H04L 29/08306* (2013.01); *H04N 5/782* (2013.01); *H04N 9/79* (2013.01);
(Continued)

(58) Field of Classification Search
CPC ................... H04N 21/4788; H04N 21/47214; H04N 21/47205; H04N 21/4627; H04N 21/4334; H04L 29/06306
See application file for complete search history.

(56) References Cited

U.S. PATENT DOCUMENTS 5,831,664 A    11/1998 Wharton et al.
7,478,414 B1   1/2009  Glusker et al.
(Continued)

FOREIGN PATENT DOCUMENTS

EP    1650927 A2    4/2006

OTHER PUBLICATIONS

Parchomovsky, Gideon et al. "Fair Use Harbors," 93 Va. L. Rev. 1483 (2007).

(Continued)

*Primary Examiner* — Hunter B Lonsberry
*Assistant Examiner* — Patrick A Ryan
(74) *Attorney, Agent, or Firm* — Swanson & Bratschun, L.L.C.

(57) ABSTRACT

The disclosed embodiments include a system, computer readable medium, and method for recording and distributing video content based on DRM parameters. For example, in one embodiment, a set-top box is disclosed that includes a processor for executing a set of instructions. The set-top box also includes memory in communication with the processor. The processor is configured to execute the set of instructions to receive user input to record a video content; determine DRM parameters associated with the video content, wherein the DRM parameters are established by at least of a content owner and a communications service provider, the DRM parameters indicating designated portions of the video content that is recordable; and record the video content based on the DRM parameters.

20 Claims, 5 Drawing Sheets

(51) Int. Cl.
*G11B 27/034* (2006.01)
*H04N 5/782* (2006.01)
*H04N 21/433* (2011.01)
*H04N 21/4627* (2011.01)
*H04N 21/472* (2011.01)
*H04N 21/4788* (2011.01)
*H04N 9/79* (2006.01)

(52) U.S. Cl.
CPC ....... *H04N21/4334* (2013.01); *H04N 21/4627* (2013.01); *H04N 21/4788* (2013.01); *H04N 21/47205* (2013.01); *H04N 21/47214* (2013.01)

(56) References Cited

U.S. PATENT DOCUMENTS

| | | |
|---|---|---|
| 7,571,458 B1 | 8/2009 | Eyal |
| 7,643,564 B2 | 1/2010 | Sheynman et al. |
| 7,870,279 B2 | 1/2011 | Chuang et al. |
| 8,253,558 B2 | 8/2012 | Emerson et al. |
| 8,260,363 B2 | 9/2012 | Roberts et al. |
| 8,286,215 B2 | 10/2012 | Daniels |
| 8,312,500 B2 | 11/2012 | Emerson et al. |
| 8,316,399 B1 | 11/2012 | Nush |
| 8,467,275 B2 | 6/2013 | Emerson et al. |
| 8,478,598 B2 | 7/2013 | Burckart et al. |
| 8,627,377 B2 | 1/2014 | LaFreniere et al. |
| 8,627,399 B2 | 1/2014 | White et al. |
| 8,731,620 B2 | 5/2014 | Roberts et al. |
| 8,756,646 B2 | 6/2014 | LaFreniere et al. |
| 8,789,113 B2 | 7/2014 | Goergen et al. |
| 8,856,855 B2 | 10/2014 | Goergen et al. |
| 2002/0083468 A1 | 6/2002 | Dudkiewicz |
| 2002/0100044 A1 | 7/2002 | Daniels |
| 2002/0124252 A1 | 9/2002 | Schaefer et al. |
| 2002/0147986 A1 | 10/2002 | Michael et al. |
| 2002/0188959 A1 | 12/2002 | Piotrowski |
| 2003/0005448 A1 | 1/2003 | Axelsson et al. |
| 2003/0128820 A1 | 7/2003 | Hirschberg et al. |
| 2003/0208777 A1 | 11/2003 | Danker et al. |
| 2004/0019807 A1 | 1/2004 | Freund |
| 2004/0049785 A1 | 3/2004 | Grzeczkowski et al. |
| 2006/0020993 A1 | 1/2006 | Hannum et al. |
| 2006/0184989 A1 | 8/2006 | Slothouber |
| 2006/0212894 A1 | 9/2006 | Knudson et al. |
| 2006/0253886 A1 | 11/2006 | Khurana et al. |
| 2007/0079345 A1 | 4/2007 | McEnroe |
| 2007/0079353 A1 | 4/2007 | Boortz |
| 2007/0220554 A1 | 9/2007 | Barton et al. |
| 2007/0280445 A1 | 12/2007 | Shkedi |
| 2008/0059992 A1 | 3/2008 | Amidon et al. |
| 2008/0115164 A1 | 5/2008 | Kiiskinen |
| 2008/0134043 A1 | 6/2008 | Georgis et al. |
| 2008/0228733 A1 | 9/2008 | Davis et al. |
| 2008/0301732 A1 | 12/2008 | Archer et al. |
| 2009/0069038 A1 | 3/2009 | Olague et al. |
| 2009/0133069 A1 | 5/2009 | Conness et al. |
| 2009/0133070 A1 | 5/2009 | Hamano et al. |
| 2009/0150925 A1 | 6/2009 | Henderson |
| 2009/0158325 A1 | 6/2009 | Johnson |
| 2009/0164559 A1 | 6/2009 | Johnson et al. |
| 2009/0217324 A1 | 8/2009 | Massimi |
| 2009/0217332 A1 | 8/2009 | Hindle et al. |
| 2009/0228929 A1 | 9/2009 | Cass |
| 2009/0249387 A1 | 10/2009 | Magdy et al. |
| 2009/0249451 A1 | 10/2009 | Su et al. |
| 2009/0265737 A1 | 10/2009 | Issa et al. |
| 2009/0293079 A1 | 11/2009 | McKee et al. |
| 2010/0058395 A1 | 3/2010 | Goergen et al. |
| 2010/0058415 A1 | 3/2010 | Goergen et al. |
| 2010/0058417 A1 | 3/2010 | Rondeau et al. |
| 2010/0064325 A1 | 3/2010 | Fishman et al. |
| 2010/0125884 A1 | 5/2010 | Howcroft |
| 2010/0149302 A1 | 6/2010 | Malik |
| 2010/0169944 A1 | 7/2010 | Rondeau et al. |
| 2010/0251325 A1 | 9/2010 | Gupta |
| 2010/0261466 A1 | 10/2010 | Chang et al. |
| 2011/0126251 A1 | 5/2011 | LaFreniere et al. |
| 2011/0126257 A1 | 5/2011 | Goergen et al. |
| 2011/0131604 A1 | 6/2011 | Van Hoff et al. |
| 2011/0270952 A1 | 11/2011 | Ray et al. |
| 2012/0018510 A1 | 1/2012 | Gardner |
| 2012/0223134 A1 | 9/2012 | Smith et al. |
| 2012/0223135 A1 | 9/2012 | Meek et al. |
| 2012/0233638 A1 | 9/2012 | Slaney et al. |
| 2012/0317599 A1 | 12/2012 | Emerson et al. |
| 2012/0324003 A1 | 12/2012 | Armstrong et al. |
| 2013/0031590 A1 | 1/2013 | Ivanov et al. |
| 2013/0241726 A1 | 9/2013 | Hunter et al. |
| 2014/0053190 A1 | 2/2014 | Sirpal |
| 2014/0074621 A1 | 3/2014 | Chai et al. |
| 2014/0130093 A1 | 5/2014 | Goergen et al. |
| 2014/0259081 A1 | 9/2014 | Chatterjee |
| 2014/0282705 A1 | 9/2014 | Chatterjee et al. |

OTHER PUBLICATIONS

U.S. Appl. No. 12/201,249; Notice of Allowance dated Mar. 14, 2014; 31 pages.

U.S. Appl. No. 12/201,313; NonFinal Office Action dated Mar. 26, 2014; 10 pages.

U.S. Appl. No. 12/201,313; Final Office Action dated Oct. 23, 2014; 11 pages.

U.S. Appl. No. 12/201,313; Final Office Action dated Feb. 27, 2015; 11 pages.

U.S. Appl. No. 14/152,696; Notice of Publication dated May 8, 2014; 1 page.

U.S. Appl. No. 12/201,273; NonFinal Office Action dated Apr. 10, 2014; 35 pages.

U.S. Appl. No. 12/201,273; Final Office Action dated Oct. 27, 2014; 38 pages.

U.S. Appl. No. 12/201,273; Notice of Allowance dated Mar. 16, 2015; 28 pages.

U.S. Appl. No. 12/201,436; Final Office Action dated Apr. 25, 2014; 30 pages.

U.S. Appl. No. 13/750,537; Notice of Allowance dated Jan. 10, 2014; 11 pages.

U.S. Appl. No. 12/347,414; Final Office Action dated Feb. 3, 2014; 16 pages.

U.S. Appl. No. 12/347,414; NonFinal Office Action dated Sep. 11, 2014; 17 pages.

U.S. Appl. No. 12/347,414; Final Office Action dated Feb. 3, 2015; 17 pages.

U.S. Appl. No. 13/567,367; NonFinal Office Action dated Jan. 30, 2014; 17 pages.

U.S. Appl. No. 13/567,367; Final Office Action dated Jul. 23, 2014; 14 pages.

U.S. Appl. No. 12/625,744; Notice of Allowance dated Feb. 5, 2014; 26 pages.

U.S. Appl. No. 12/625,762; Notice of Allowance dated Jun. 3, 2014; 18 pages.

U.S. Appl. No. 13/787,371; NonFinal Office Action dated Apr. 9, 2014; 30 pages.

U.S. Appl. No. 13/787,371; Final Office Action dated Aug. 22, 2014; 32 pages.

U.S. Appl. No. 13/787,371; Notice of Publication dated Sep. 11, 2014; 1 page.

U.S. Appl. No. 13/787,371; NonFinal Office Action dated Mar. 5, 2015; 40 pages.

U.S. Appl. No. 13/962,531; Notice of Publication dated Sep. 19, 2014; 1 page.

U.S. Appl. No. 13/962,531; NonFinal Office Action dated Dec. 18, 2014; 47 pages.

U.S. Appl. No. 13/567,367; NonFinal Office Action dated Jun. 10, 2015; 21 pages.

U.S. Appl. No. 13/962,531; Final Office Action dated Jun. 19, 2015; 30 pages.

FIG. 5

Graphical User Interface      500

☑ Set preferences for distribution before recording    504    502

☐ Send automatically when recording finished

☐ Set preferences for distributions after recording

| Username | D-Em |
| Password | ******** |

◀ ▶ ▶| ❙❙    ☑ Edit the video content?    506

Video Content Controls

508

User Content

[1] Content Label: Meet the in-laws, brawl in the hall
012109 5:35 p.m
Duration: 5 minutes 8 seconds
Preferences: Facebook

[2] News: President visit to school
011509 9:39 a.m
Duration: 50 seconds
Preferences: YouTube, Email List – Friends

[3] Movie: The Hacker's Code
012109 9:22 p.m
Duration: 2 clips 30 seconds
Preferences: Text – John, IM - Melissa

SYSTEM AND METHOD FOR SHARING USER CONTENT THROUGH A SET-TOP BOX

CROSS REFERENCE TO RELATED APPLICATIONS

This application is a Continuation of U.S. patent application Ser. No. 12/475,158 filed on May 29, 2009 entitled SYSTEM AND METHOD FOR SHARING USER CONTENT THROUGH A SET-TOP BOX the entire teachings of which are incorporated herein.

BACKGROUND

The use of and development of communications has grown nearly exponentially in recent years. The growth is fueled by larger networks with more reliable protocols and better communications hardware available to service providers and consumers. In many cases, social networking websites that share user posted content are being utilized by increasing numbers of user. Many communications and entertainment systems are growing together as people expect services that are more intuitive and integrated with their day-to-day life. Some systems, devices, features, and services have not kept pace as well with the growth experienced by sections of the communications industry.

SUMMARY

One embodiment provides a system and method for managing video content through a set-top box. User input may be received to record the video content to a set-top box. Digital rights management parameters associated with the set-top box may be determined. The video content may be recorded directly to the set-top box in response to the DRM parameters. The video content may be edited based on selections by a user in response to receiving a selection to edit the video content. Preferences for distributing the video content may be determined. The video content may be distributed from the set-top box to a number of addresses in response to the preferences.

Another embodiment provides a set-top box for managing video content. The set-top box includes a processor for executing a set of instructions. The set-top box also includes memory in communication with the processor. The processor is configured to execute the set of instructions to receive user input to record a video content; determine DRM parameters associated with the video content, wherein the DRM parameters are established by at least of a content owner and a communications service provider, the DRM parameters indicating designated portions of the video content that is recordable; and record the video content based on the DRM parameters.

Yet another embodiment provides a non-transitory computer readable medium comprising computer executable instructions that when executed causes one or more machines to perform operations comprising for recording and distributing video content based on DRM parameters.

The above described embodiments are provided merely as a general summary of particular embodiments of the inventions disclosed herein and are not intended to be exhaustive or limiting with respect to the claimed inventions. Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein:

FIG. 5 is a pictorial representation of a graphical user interface for a set-top box in accordance with an illustrative embodiment.

DETAILED DESCRIPTION OF THE DRAWINGS

The illustrative embodiments of the present invention provide a system and method for sharing user content utilizing a set-top box. The user content may include video content or clips recorded by the set-top box or by the user. The video content is all or a portion of media content displayable to the set-top box. The video content may include television programs, Internet content, satellite content, cable content, movies, slide shows, presentations, and other similar media elements. The set-top box may distribute the video content automatically based on pre-configured user preferences and settings or based on specific selections and designations. As a result, the user may share and manage video content without accessing multiple devices.

Figure 1:
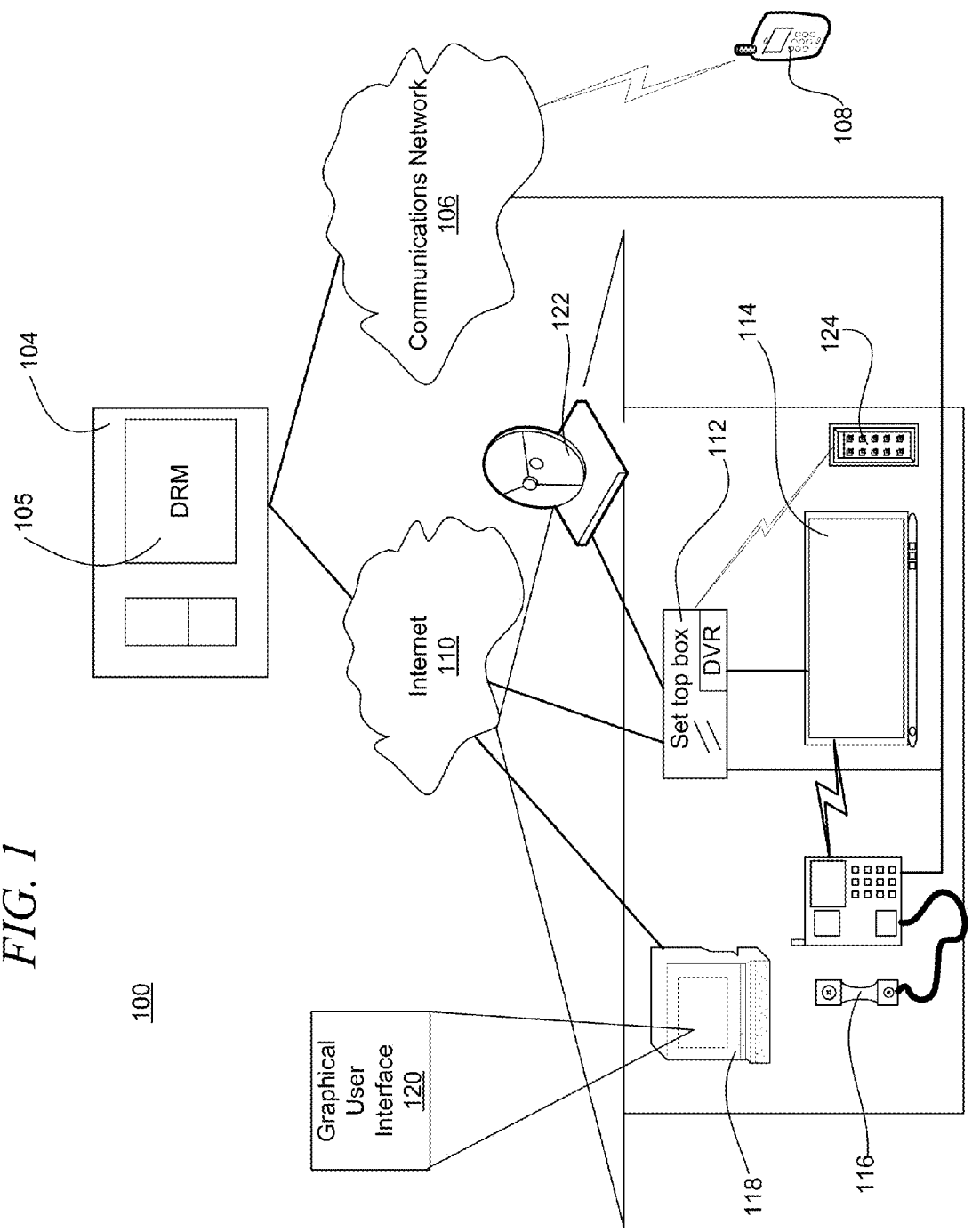
FIG. 1 is a pictorial representation of a communications system in accordance with an illustrative embodiment.
Figure 2:
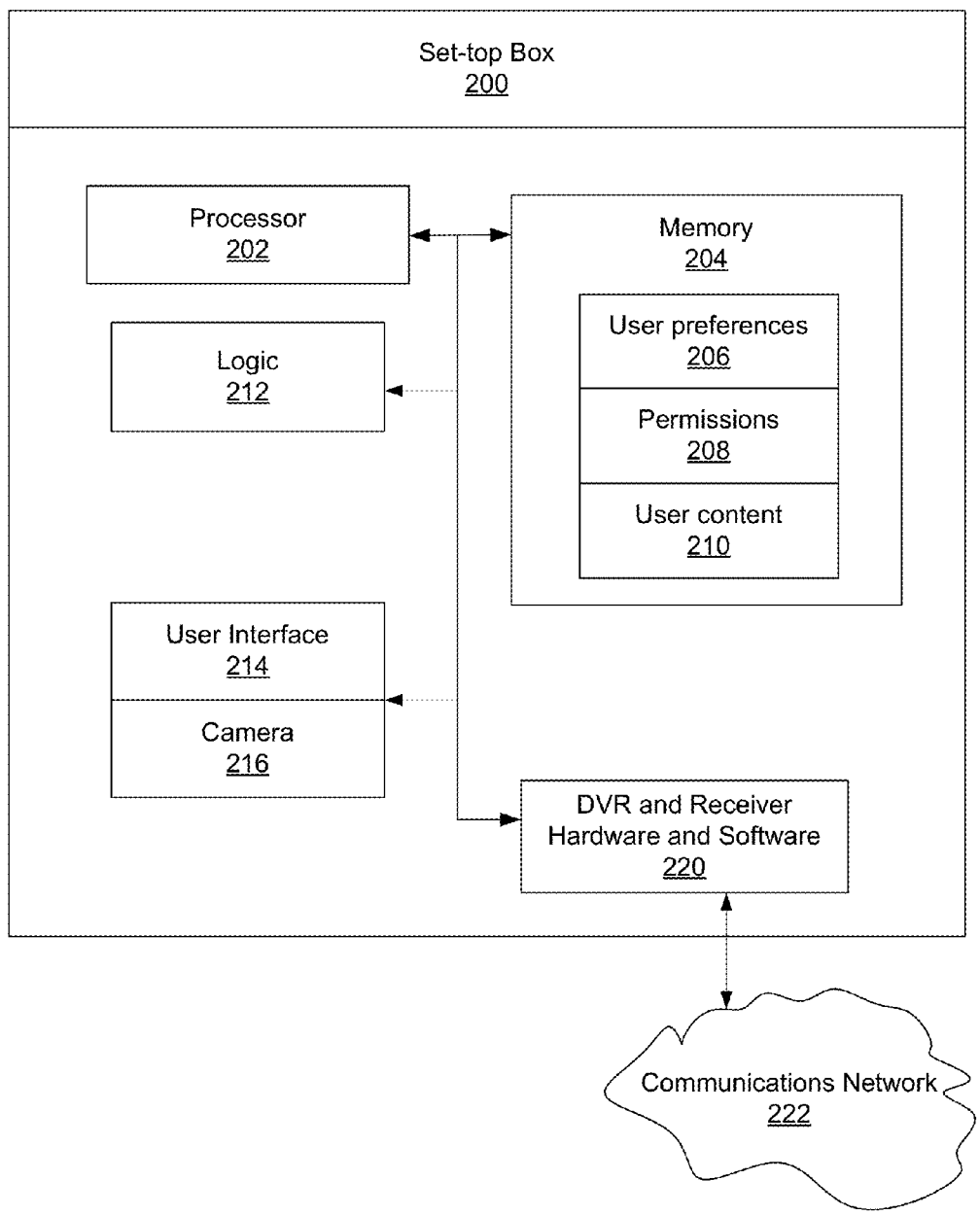
FIG. 2 is a block diagram of a set-top box in accordance with an illustrative embodiment.

FIG. 1 is a pictorial representation of a communications system 100 in accordance with an illustrative embodiment. The communication system 100 of FIG. 1 includes various elements used for wireless and wired communication. In one embodiment, the communication system 100 may include a communications management system 104, digital rights management (DRM) logic, a communications network 106, a wireless device 108, the Internet 110, a set-top box 112, a television 114, a phone 116, a client device 118 including a graphical user interface 120, a satellite 122, and a remote control 124.

Communications within the communications system 100 may occur on any number of networks which may include wireless networks, data or packet networks, cable networks, satellite networks, private networks, and publicly switched telephone networks (PSTN), herein represented by the communications network 106. The networks of the communications system 100 may represent a single communication service provider or multiple communications services providers. The features of the embodiments may be implemented by one or more elements of the communications system 100 independently or as a networked implementation.

The communications system 100 may further include any number of hardware and software elements that may not be shown in the example of FIG. 1. For example, the communications system 100 may include exchanges, switches, antennas, towers, switching centers, routers, application servers, media servers, service brokers, call agents, edge routers, gateways (signaling, trunking, access, sub, etc.), IP network service providers, adapters, exchanges, switches, users, and networks.

The television 114 is one embodiment of a display. The display is a device for displaying visual or tactile information. The display may also be a computer monitor, projector, Braille pad, or other similar device, system or equipment suitable for displaying content. The television 114 may be any number of display devices for displaying analog or digital content in any available standard or high definition formats.

As shown, the television 114 may be integrated with or incorporate the set-top box 112 or may be networked to the set-top box 112, as further shown in FIG. 1.

The set-top box 112 is a device for receiving, converting, formatting, and sending the image and sound of media content to one or more associated displays. The broadcast may be communicated by the set-top box 114 utilizing any number of connection types, signals, and formats, such as HDMI, coaxial, digital, RCA connectors, analog, compressed, WiFi, and so forth. In one embodiment, the set-top box 112 may be a media receiver, digital or personal video recorder, a gaming device (i.e., devices manufactured by Nintendo®, Microsoft®, and Sony®). Content may be streamed to the television 114 through the communications network 1106 or through another data connection. The television 114 may receive and process content from a plain old telephone service (POTS) line, cable, satellite, fiber optic, DSL, Internet Protocol television, or other communications medium.

In one embodiment, the set-top box 112 may also be connected to a voice communications line through the communications network 106. The different elements and components of the communications system 100 may communicate using wireless communications including satellite connections and/or hardwired connections, such as fiber optics, T1, cable, DSL, high speed trunks, and telephone lines.

The voice communications line may be a POTS or VoIP line. The set-top box 112 may be directly connected to the voice communications line or may indirectly be connected through a wireless connection with the phone 116. As a result, the set-top box 112 acts as a locally accessible and managed device. In another embodiment, the set-top box 112 may be networked to communicate with the communications network 106 and the Internet 110.

The communications management system 104 is one or more devices utilized to enable, initiate, route, and manage communications between one, or more media, network, computing, or other communications devices. The communications management system 104 may include one, or more devices or systems networked to manage or control all or portions of the communications network 106 and Internet 110. For example, the communications management system 104 may include any number of servers, routers, switches, or advanced intelligent devices. The communications network 106 sends and receives the electronic signals through any number of transmission mediums. In one embodiment, the communications management system 104 and the communications network 106 or Internet 110 may implement streaming media, such as VoIP and Internet protocol television. The Internet 110 may also be any number of networks suitable for packet or data communications.

The DRM logic 105 is logic that manages access and utilization of media content. In one embodiment, the DRM logic 105 may include controls and limiters for sampling or recording media content utilizing the set-top box 112. In particular, the DRM logic 105 may include DRM parameters that impose limitations on the utilization, management, access, and distribution of media content. For example, the DRM logic 105 may stipulate that four thirty second snippets from any portion of a television program may be sampled for sharing with social networking sites or communication to contacts or other users. In one embodiment, the DRM logic 105 may require that the snippet include a link or access to the original television program as a way of marketing the original programming to increase viewership and advertising revenues.

In one embodiment, the television 114, set-top box 112, home telephone 116, and client device 118 may communicate with one another through an internal wired or wireless network, such as WiFi, Ethernet, or powerline communications. Similarly, each of the aforementioned devices may communicate with external devices, systems, set-top boxes and users through the Internet 110 or through the communications network 106.

The communications management system 104 and may include a portal, web page, or other access point for interfacing with the set-top box 112, a user, or a device A portal may be a web site that functions as a central point of access to information on the Internet or an intranet. The portal may be accessed from any computing or communications system or device enabled to communicate through a network connection. For example, the portal may be accessed through the Internet 110 by the set-top box 112 in order to interface with the DRM logic 105 to determine the digital rights management rules, logic, or provisions that govern sampling, storing, or recording content from a content provider. The portal or the server may be accessed using any number of devices, such as the wireless device 108, the client device 118, or the set-top box 112 in order to specify the preferences for recording, storing, and distributing the video content.

The elements of the communications system 100 may communicate using a signal control protocol, such as a signaling system number 7 (SS7) protocol. The SS7 protocol or similar protocols are used in publicly switched networks for establishing connections between switches, performing out-of-band signaling in support of the call-establishment, billing, routing, and implementing information-exchange functions of a publicly switched network or the communications network The wireless device 108 may communicate with and the communications system may include one or more transmission towers, exchanges, mobile switching centers, central offices, servers, advanced intelligent network devices, or other communications equipment using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 108 may include cellular phones, Blackberry®, personal digital assistances (PDA), mp3 players, laptops, evolution data optimized (EDO) cards, multi-mode devices, and other wireless communication devices and elements. Although described for the set-top box directly, the set-top box may similarly be controlled by the wireless device 108 remote control 124, the client 118, or from another device displaying the graphical user interface.

The graphical user interface 120 is an interface for allowing the user to interact with the devices and elements of the communication system 100. In one embodiment, the graphical user interface 120 is a recording and editing application utilized by the set-top box 112 for displaying data, information, images, and other content to the user and receiving user input and feedback. For example, utilizing the graphical user interface 120 displayed to any of the aforementioned devices, the user may be able to specify how and when media content is recorded, edited, and distributed to the television 114. The user may also specify how the video content may be managed through the remote control 124 or through the other communications devices as shown in FIG. 1. In one embodiment, the video content may be generated in response to a request or communication from another user or device.

In another embodiment, the communications management system 104 may communicate with a number of set-top boxes. The set-top boxes may receive service through a single communications service provider or through multiple communications service providers. The set-top box 112 or portal may store access information that allows the wireless device 108 or communications management system 104 to access and manage the set-top box 112. The access information may include an access number, account number, password, pin number, phone number or other information, data, or identifiers that may be required to access the set-top box 112.

Commands that are given by the user visually, verbally, tactilely, or electronically utilizing the television 114 and remote control 124 may be converted to key sequences, verbal commands, or other command formats that may be implemented by the set-top box 112 The set-top box 112 controls the audio and video content displayed or played by the television 114. In one embodiment, the satellite 122 may receive content that the set-top box 112 formats, decrypts or otherwise, processes for display on the television 114. The set-top box 112 may also receive media content through the Internet 110 or through the communications network 106. In response to a user selection a menu or interface may be displayed for recording or sampling video content.

In one embodiment, the set-top box 112 may utilize the portal to access contacts, or information that is stored in one or more address books. In one embodiment, the portal may compile contact information in a global directory for all contacts included in email, voicemail, social, networking, chat, and other accounts for contacts of the user.

The interface may require that a user provide a password or other pass code in order to access one or more accounts of the set-top box. In addition, the interface to the set-top box system, which may be the graphical user interface 120, may allow the user to select an avatar, picture, user name or other information associated with any distributed video content. The user may utilize the graphical user interface 120 displayed on the television 114 or client 118 to easily determine which media content to review, playback, or distribute from the set-top box.

The set-top box 112 may be a digital video recorder, satellite 122 transceiver, cable box or other device utilized for processing signals for display by the television 114. The set-top box 112 may similarly allow editing, and control of recording and playback. For example, the set-top box 112 may allow media content to be rewound, slowed, fast forwarded, changed to a different pitch, enhanced, filtered, or otherwise controlled.

In another embodiment, the set-top box 112, communications management system 104, or DRM logic 105 may include one or more databases for storing user preferences, DRM permissions, rules, and specifications, and other parameters that govern recording of video content both original material recorded by a user and media content sampled by a user.

The set-top box may include one or more partitions that may be dedicated to different users. Each partition may have an authentication space. The authentication space may be authentication logic for one or more users. For example, the authentication space may authorize the user to set preferences, implement changes, review information, or perform other updates. For example, a user may be first required to provide a secure identifier, such as a user name, password, or other authentication code or hardware interface, to verify the user is authorized to record and distribute media content.

Figure 3:
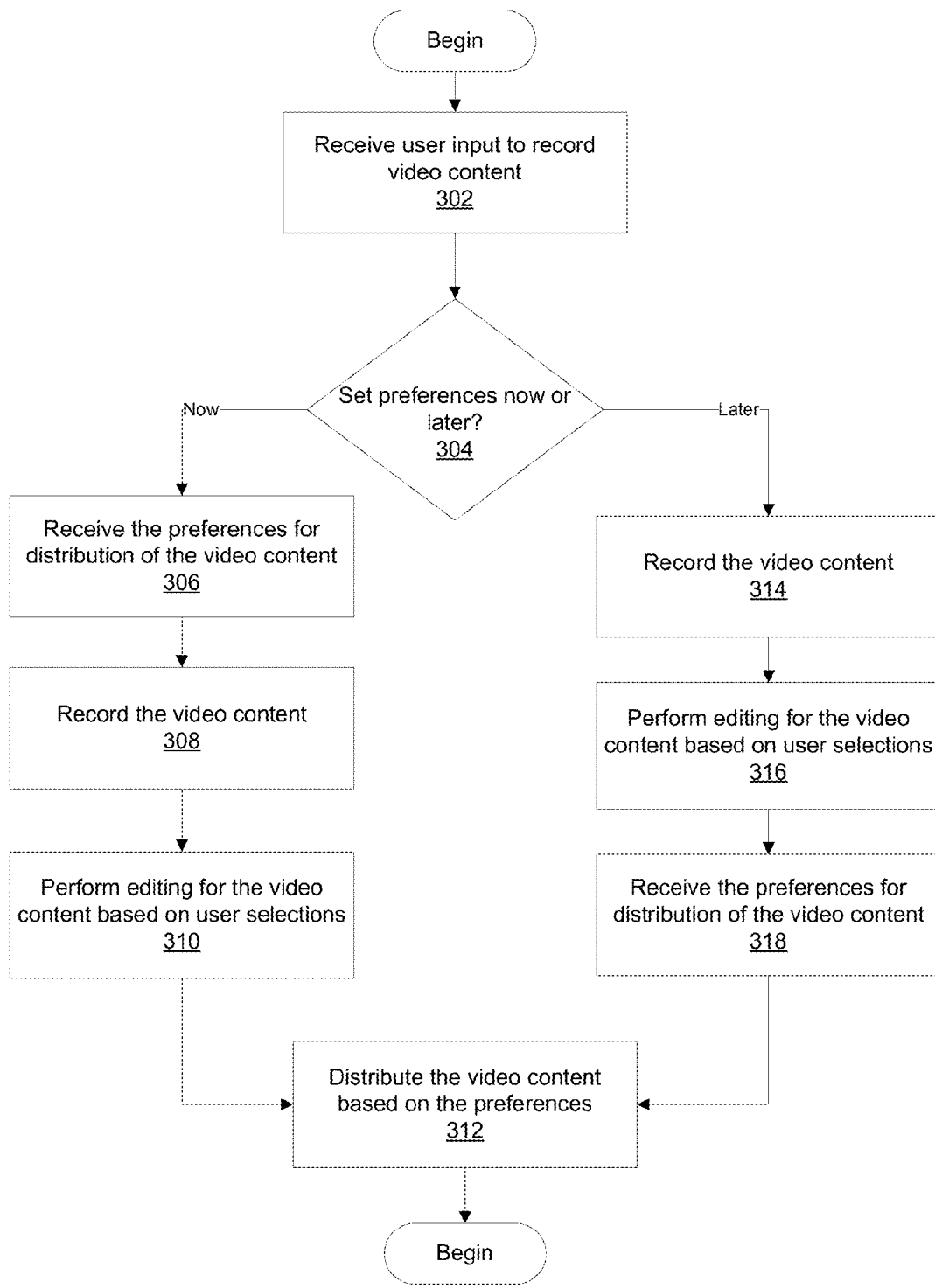
FIG. 3 is a flowchart of process for recording video content to a set-top box in accordance with an illustrative embodiment.

FIG. 3 is a block diagram of a set-top box 200 in accordance with an illustrative embodiment. The set-top box 200 is a particular implementation of the set-top box of FIG. 1. In one embodiment, the set-top box 200 may include a processor 202, a memory 204, user preferences 206, permissions 208, user content 210, logic 212, a user interface 214, a camera 216, a network interface 218, and DVR and receiver hardware and software 220.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory 204. The memory 204 may include a hard disk, random access memory, cache, removable media drive, mass storage, or configuration suitable as storage for data, instructions, and information. In one embodiment, the memory 204 and processor 202 may be integrated. The memory 304 may use any type of volatile or non-volatile storage techniques and mediums.

The memory 204 may store messages recorded on the set-top box or digital video recorder (DVR). In one embodiment, the memory 204 is integrated with the DVR and receiver hardware and software 220. In one embodiment, the memory 204 may be partitioned for utilization by the DVR and receiver hardware and software 220 as well as other components of the set-top box 200. The set-top box 200 may include any number of computing and telecommunications components not specifically described herein for purposes of simplicity, such devices or elements may include busses, motherboards, circuits, ports, interfaces, cards, converters, adapters, connections, transceivers, displays, antennas, and other similar components.

The user preferences 206 are settings, criteria, and parameters controlling the media and communications features of the set-top box 200. In one embodiment, the user preferences may control sampling and distribution of the media content based on feedback and selections by a user. For example, the user preferences may store settings for share video content. For example, the user preferences may compile historical information for sharing video content and may present the most commonly utilized settings for sharing the video content when video content is recorded or may be recorded. In one embodiment, the user preferences 206 may store a number of different user profiles. The user preferences 206 may store contact lists, preferred social networking sites and access information including usernames and passwords, and other similar details, information and settings.

The permissions 208 are the parameters that locally govern the management and utilization of video content. In on embodiment, a number of users may utilize the set-top box 200 and as a result the permissions may set limits and parameters that locally govern utilization of the set-top box. For example, the permissions 208 may establish rating levels associated with media content that users of the set-top box 200 may store and communicate to other destinations. The permissions 208 may also set times of day that the media content may be shared, such as between 8:00 a.m. and 8:00 p.m.

The user content 210 stores content generated by the user. The user content 210 may also store preferences governing utilization of user recorded content. In one embodiment, video content may be associated with a user response that may also respond to the video content. The user content and video content may be linked or integrated for sending the content as a single video clip. The example, the user recorded portion may paraphrase why the user thinks the content is important, provide commentary or background information, establish a message to one or more other individuals, and provide other forms of creative communication. In another embodiment, the user content may be utilized as a voice over for the video content. The video content may be sent in a media content format or may be sent as a link that may be accessible from the set-top box.

The user interface 214 is an audio, visual, or tactile interface for displaying images, data, text, and information to a user. The user interface 214 may generate a graphical user interface for communication to one or more interconnected displays. The user interface 214 may also be any number of buttons, scroll wheels, screens, touch interfaces, or other elements for receiving and outputting information to a user. In one embodiment, the user interface 214 may provide an interface for receiving input from a remote control, such as a Bluetooth or infrared remote control. The user interface 214 may also include a keyboard, a touch screen, a Braille interface, speakers, a microphone, and other similar input and output devices.

The camera 216 is an image capture device. The images may include still and video images that may be retrieved and stored in the memory 204 or communicated directly to one or more other users. In one embodiment, the camera 216 may be integrated with the set-top box 200. In another embodiment, the camera may be externally linked utilizing any number of wireless or wired connections, such as a high definition media interface (HDMI), USB, Bluetooth, or WiFi connection. In particular, the camera 216 may capture the user content 210 for storage.

The digital video recorder and receiver hardware and software 220 are the hardware and software elements that allow the set-top box to function as a DVR and as a receiver. In one embodiment, the DVR and receiver hardware and software 220 may include logical elements for converting signals into content that may be displayed to the television or other display. The DVR and receiver hardware and software 220 may also incorporate network interface elements for communicating with the communications network 222 which may include a satellite, cable, DSL, IPTV, or other networks. For example, the incoming content may be decoded and reformatted for display on a high-definition television. For example, the DVR and receiver hardware and software 220 may format the satellite signals for display to the user and similarly, may function to display a message icon at the same time the standard content is displayed to the user.

FIG. 3 is a flowchart of process for recording video content to a set-top box in accordance with an illustrative embodiment. The process of FIG. 3 may be implemented by a set-top box. In addition, any number of peripheral devices operable to communicate with the set-top box may also be utilized. For example, the set-top box may receive user input, feedback, instructions and commands through one or more remote control devices. In another embodiment, the set-top box may be controlled utilizing a web portal configured to interface with the set-top box through one or more communications networks and connections. Similarly, any number of remote access technologies or connections may be utilized to receive user input for controlling the set-top box as herein described.

In one embodiment, the process of FIG. 3 may begin by receiving user input to record video content (step 302). The user input may be an electronic signal received through an infrared or Bluetooth remote, a voice command selection of one or more buttons or interfaces associated with the set-top box, or other input provided by the user and received by the set-top box.

In one embodiment, the video content is a portion of programming or immediate content being displayed to the set-top box. For example, the video content may include a scene from a movie, user produced slide show, music track, internet search result or playback or other media content displayable to the set-top box. In one embodiment, the set-top box determines whether recording video content is allowed based on the content owner, communication service provider, and type of content being displayed to the set-top box. One embodiment of such a determination is further described in the process of FIG. 4. For example, an administrator, such as a parent may establish preferences based on rating and time of day in addition to DRM logic or parameters that may indicate what other household members may share utilizing the set-top box.

Next, the set-top box determines whether to set preferences now or later (step 304). The determination of step 304 may be implemented based on user feedback, previous configurations of the set-top box or based on a response of a user to a prompt generated by the set-top box. For example, the prompt may request that the user indicate whether to set preferences before or after recording the video content.

If the set-top box determines to set preferences now, the set-top box receives the preferences for distribution of the video content (step 306). The set-top box may provide an interactive interface for selecting how the video content is to be distributed. In one embodiment, the set-top box may display one or more distribution methods including text messaging, e-mail, posting to a website or social networking location, making a link accessible to one or more users as stored on the set-top box, instant messaging and any a number of other communications. The preferences may also specify one or more individual groups or organizational contacts for communicating the video content.

Next, the set-top box records the video content (step 308). The video content may be recorded by selecting a start and a stop time in real time or after the fact. In one embodiment, the set-top box includes a personal or digital video recorder (DVR) that may be utilized to record, queue or buffer media content. In another embodiment, the set-top box may receive user interaction through a mobile wireless device such as a cell phone that communicates with the set-top box directly or through one or more communications networks.

Next, the set-top box performs editing for the video content based on user selections (step 310). The user may access a video editing application interface, logic or hardware configured to edit the video content recorded in step 308. In one embodiment, the utilization or editing of the video content may also be based on permission, rules, laws or other controlling permission established for the video content. For example, while some movie directors and producers may allow users to record clips of less than 30 seconds of their movies they may not allow any editing of the sampled content. For example, the user may be able to edit the video content to remove foul language, utilize pixilated boxes for nudity, cut sections of the video content, crop the video content, remove poor image effects, adjust the lighting and otherwise edit the video content utilizing processes, steps and methods known in the art.

Next, the set-top box distributes the video content based on the preferences (step 312). If the set-top box determines to set preferences later in step 304, the processes of steps 306, 308 and 310 are performed in a differing order. For example, step 314 may correspond to step 308, step 316 may correspond to step 310 and step 318 may correspond to step 306.

Figure 4:
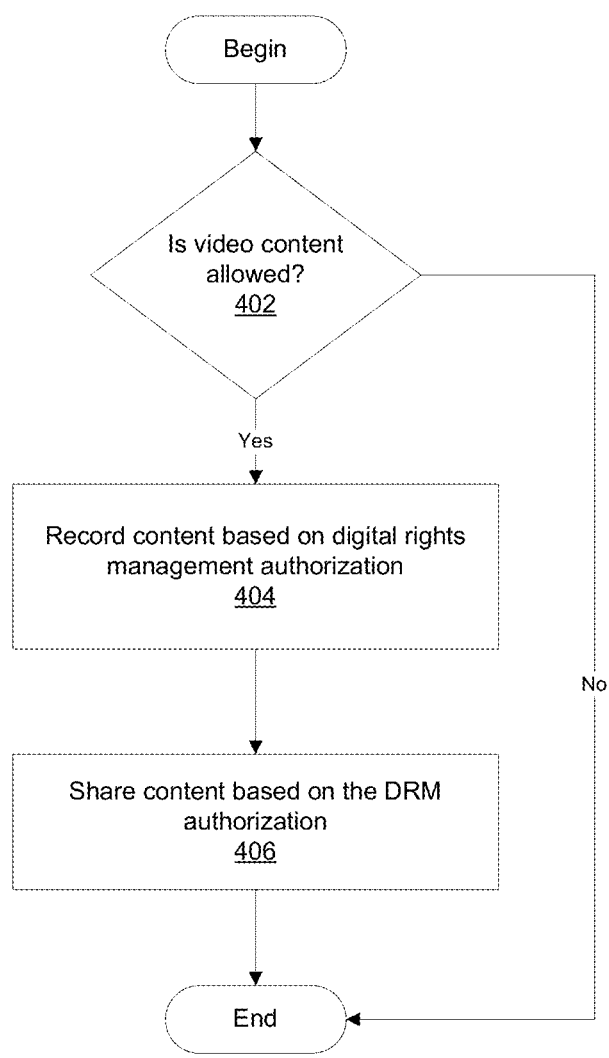
FIG. 4 is a flowchart of process for distributing video content to a set-top box utilizing DRM in accordance with an illustrative embodiment.

FIG. 4 is a flowchart of process for distributing video content to a set-top box utilizing DRM in accordance with an illustrative embodiment. The process of FIG. 4 may also be implemented by a set-top box. In one embodiment, the set-top box may interact with a service provider or digital rights management logic of one or more parties which may include content owners, service providers, and others. For example, the process of FIG. 4 may be utilized as a precondition to recording the video content as described in FIG. 3.

The process may begin with the set-top box determining whether video content is allowed (step 402). If the video content is not allowed in step 402 the process may end and the user may be unable to record the video content. In one embodiment, the determination of step 402 may be made based on permissions communicated within media content. For example, a television program streams to the set-top box of a user for display on a television may include an encoded signal indicating permission and digital rights management rules, regulations, stipulations and other criteria. For example, the video content may include an encoded signal or message that indicates a maximum of three 45 second clips may be recorded from a television program.

In one embodiment, the allowed video content may correspond to current copyright laws indicating fair use. Some content owners may not be inclined to allow recording of the content and as a result the set-top box may be prohibited from recording the content. If the set-top box determines the video content is allowed in step 402 the set-top box records the content based on digital rights management authorization (step 404). As previously described the DRM authorization may include a number of clips or video content that may be recorded, a maximum size or length, particular portions of the media content that may be recorded or not. For example, explicit or adult content may not be subject to user recording to ensure the privacy of individuals and exploitation of media content.

The operation of the set-top box based on the DRM authorization may allow service providers and content owners to feel more accepting of shared video content. In some cases the video content as shared by individual users may create interest or buzz about the media content that may encourage viewing or purchase of the media content and thereby further the content owner's business or agenda. Similarly, content owners and service providers may broadly or explicitly limit the video content that may be sampled or shared with other users.

Next, the set-top box shares the content based on the DRM authorization (step 406). The content may be shared by distributing the content to one or more users, social networking sites, blogs, micro-blogging accounts or other online or electronic resources.

FIG. 5 is a pictorial representation of a graphical user interface for a set-top box in accordance with an illustrative embodiment. FIG. 5 illustrates one embodiment of a graphical user interface 500. The graphical user interface 500 may include any number of buttons, menus, drop-down lists, selection elements, icons, fields, graphics or other interactive elements.

In one embodiment, the graphical user interface 500 may be utilized to review the DRM authorizations or permissions utilized to distribute and share video content as well as provide user input for setting preferences for distributing the video content. In one embodiment, the graphical user interface 500 may include sections 502, 504, 506 and 508.

In one embodiment, one or more user profiles may be accessible to a set-top box. The user profiles may specify what video content may be recorded according to limitations set by an administrator or master user. For example, a parent may establish the media content that a child may share with friends or social networking sites. The user profile may include limitations regarding rating, language and other information that may be determined utilizing closed captioning, speech recognition or other similar technologies. As a result the user may be required to sign in utilizing a username and password as shown in section 502. The indicators of section 504 may allow a user to set preferences for distributing the video content before or after recording.

In another embodiment, the user may also establish whether editing the video content may be performed before distribution of the video content. For example, a user may select to review and shorten video content before the video content is communicated to one or more other users. Section 506 may provide the user video content controls for recording video content, playing back the video content, pausing, rewinding, fast forwarding and other control features commonly utilized to record video content. Section 506 may also include an icon or indicator allowing a user to edit the video content. Any number of video editing applications may be launched or embedded within the graphical user interface 500 for utilization by the user.

Section 508 may display the video content that is or has been recorded. For example, section 508 may allow a user to label the video content, view information such as length, details, date recorded and distribution preferences that are utilized to communicate the video content to one or more users or groups, sites, servers or other elements. The video content may include previously recorded media content or video content recorded by the user itself. A content label for the video content may be automatically retrieved from an associated name of the media content or may be modified or added based on feedback from the user. The preferences may indicate how the media content is distributed. For example, the preferences may include a login and password utilized to upload video content to a Facebook page of the user.

In another embodiment, the video content may be e-mailed to a contact list of friends as well as posted to a video distribution site such as YouTube under the user's account name. In another embodiment, the set-top box may be utilized to send a text or instant message with the video content or with a link to the video content for retrieval by any a number of users.

The previous detailed description is of a small number of embodiments for implementing the invention and is not intended to be limiting in scope. The following claims set forth a number of the embodiments of the invention disclosed with greater particularity.

The invention claimed is:

1. A method for managing video content through a set-top box, the method comprising:
   receiving user input to record the video content to a set-top box;
   determining digital rights management (DRM) parameters associated with the set-top box, wherein the DRM parameters are established by a content owner or a communications service provider and indicate at least whether the video content is recordable for distribution by a user and a maximum length of selected video content that is distributable, wherein the selected video content comprises of particular pre-specified portions of the video content designated by the content owner or the communications service provider that are recordable for distribution; and
   recording the video content directly to the set-top box in response to the DRM parameters.

2. The method of claim 1, further comprising editing the video content based on the DRM parameters to generate the selected video content in response to receiving a selection to edit the video content for distribution.

3. The method of claim 1, wherein the user input is a response to an invitation for a video response communicated to the set-top box.

4. The method of claim 1, further comprising displaying an interface for editing the video content in response to the selections.

5. The method of claim 1, further comprising:
determining preferences for distributing the selected video content; and
distributing the selected video content from the set-top box to a plurality of addresses in response to the preferences, wherein the addresses include one or more email addresses, websites, and media servers.

6. The method of claim 5, wherein the preferences are established prior to the recording and include a list of contacts of the user available through one or more social networking sites.

7. The method of claim 1, wherein distributing further comprises:
distributing a link for a secondary user to access the selected video content stored in the set-top box.

8. The method of claim 5, wherein the DRM parameters determines whether the selected video content is distributable to a social network site.

9. The method of claim 8, further comprising utilizing the DRM parameters to ensure that the selected video content is not further distributed by a secondary user.

10. The method of claim 9, wherein the preferences are received as part of the user input, and wherein the preferences include permissions for the secondary user to temporarily access the selected video content.

11. A set-top box for managing video content comprising:
a processor for executing a set of instructions;
a memory in communication with the processor, the processor configured to execute the set of instructions to:
receive user input to record a video content;
determine DRM parameters associated with the video content, wherein the DRM parameters are established by at least of a content owner and a communications service provider and indicate at least whether the video content is recordable for distribution by a user and a maximum length of selected video content that is distributable, wherein the selected video content comprises of particular pre- specified portions of the video content designated by the content owner or the communications service provider that are recordable for distribution; and
record the video content based on the DRM parameters.

12. The set-top box of claim 11, further comprising a network interface, wherein the processor is further configured to execute the set of instructions to communicate with a plurality of addresses for distributing the recording of the video content via the network interface.

13. The set-top box of claim 12, wherein the set-top box distributes the recording of the video content by sending a link for a secondary user to access the recording of the video content stored on a data storage component of the set-top box, and wherein the recording of the video content is streamed to the secondary user from the data storage component of the set-top box in response to a selection of the link.

14. The set-top box of claim 11, further comprising:
a camera in communication with the processor, the processor further configured to execute the set of instructions to record user content and integrate the user content into the recording of the video content.

15. The set-top box of claim 11, wherein the DRM parameters control recording and editing of the video content, and distribution of the recording of the video content from the set-top box.

16. A non-transitory computer readable medium comprising computer executable instructions that when executed causes one or more machines to perform operations comprising:
receiving user input to record a video content;
determining DRM parameters associated with the video content, wherein the DRM parameters are established by at least of a content owner and a communications service provider and indicate at least whether the video content is recordable for distribution by a user and a maximum length of selected video content that is distributable, wherein the selected video content comprises of particular pre- specified portions of the video content designated by the content owner or the communications service provider that are recordable for distribution; and
record the video content based on the DRM parameters.

17. The computer readable medium of claim 16, further comprising computer executable instructions that when executed causes the one or more machines to edit a recording of the video content based on the DRM parameters in response to receiving a request to distribute the video content.

18. The computer readable medium of claim 16, further comprising computer executable instructions that when executed causes the one or more machines to distribute a recording of the video content by sending a link to a user to access the recording of the video content stored locally on the one or more machines, and wherein the recording of the video content is streamed to the user from the one or more machines in response to a selection of the link.

19. The computer readable medium of claim 16, wherein the DRM parameters determines whether a recording of the video content is distributable to a social network site.

20. The computer readable medium of claim 16, wherein the DRM parameters determines whether a recording of the video content is distributable to a video sharing site.

* * * * *